(12) United States Patent
Bracha et al.

(10) Patent No.: US 7,895,156 B2
(45) Date of Patent: Feb. 22, 2011

(54) METHOD, SYSTEM, AND COMPUTER PROGRAM PRODUCT FOR IMPLEMENTING A MODEL EXCHANGE FRAMEWORK GENERATING A SYNCHRONIZATION RECORD IN RESPONSE TO A MODEL EXCHANGE REQUEST USING FUSION TECHNOLOGY

(75) Inventors: Gilad Bracha, Los Altos, CA (US); Yaron Kashai, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 441 days.

(21) Appl. No.: 11/966,985

(22) Filed: Dec. 28, 2007

(65) Prior Publication Data

US 2009/0172042 A1 Jul. 2, 2009

(51) Int. Cl.
*G06F 17/00* (2006.01)
*G06F 15/16* (2006.01)
*G05B 13/02* (2006.01)

(52) U.S. Cl. .................. 707/624; 707/614; 707/620; 700/29; 709/203

(58) Field of Classification Search ......... 707/609–614, 707/620, 623, 624–625, 656, 617, 618; 706/45–50; 709/203–204, 216–220; 700/29–31, 97
See application file for complete search history.

(56) References Cited

U.S. PATENT DOCUMENTS

| | | | |
|---|---|---|---|
| 5,596,744 A * | 1/1997 | Dao et al. | 1/1 |
| 6,321,250 B1 * | 11/2001 | Knape et al. | 709/203 |
| 6,341,291 B1 * | 1/2002 | Bentley et al. | 707/203 |
| 6,845,383 B1 * | 1/2005 | Kraenzel et al. | 707/200 |
| 6,920,486 B2 * | 7/2005 | Kiiskinen | 709/214 |
| 2001/0025299 A1 * | 9/2001 | Chang et al. | 709/204 |
| 2002/0059299 A1 * | 5/2002 | Spaey | 707/104.1 |
| 2002/0174180 A1 * | 11/2002 | Brown et al. | 709/203 |
| 2003/0009603 A1 * | 1/2003 | Ruths et al. | 709/318 |

(Continued)

FOREIGN PATENT DOCUMENTS

WO WO 02/075539 * 9/2002

OTHER PUBLICATIONS

Wang Chao et al. [hereafter Wang], Data fusion, the core technology for future on-board data process system, published 2002 conference proceedings p. 1-7.*

(Continued)

*Primary Examiner*—Srirama Channavajjala
(74) *Attorney, Agent, or Firm*—Vista IP Law Group LLP

(57) ABSTRACT

Disclosed are a method, a system, and a computer program products for implementing model exchange in a system design. In various embodiments, the method or system receives a model exchange request from a client where model exchange request comprises a first synchronization record which comprises a delta of both a program aspect and a data aspect between a system design on the client and a system design on the server, implements the first model exchange request by processing the first model exchange, generates a second synchronization record in response to the first model exchange, transmitting the second synchronization record to the first client by using a fusion technology, and displaying a result of implementing the first model exchange request or storing the result in a tangible computer readable medium.

33 Claims, 10 Drawing Sheets

U.S. PATENT DOCUMENTS

| | | | | | |
|---|---|---|---|---|---|
| 2004/0054711 | A1* | 3/2004 | Multer | | 709/201 |
| 2005/0033777 | A1* | 2/2005 | Moraes et al. | | 707/202 |
| 2005/0102364 | A1* | 5/2005 | Ozzie et al. | | 709/207 |
| 2007/0260475 | A1* | 11/2007 | Bhanote | | 705/1 |
| 2009/0172632 | A1* | 7/2009 | Kashai et al. | | 717/104 |
| 2009/0281648 | A1* | 11/2009 | Gotou et al. | | 700/97 |

OTHER PUBLICATIONS

Matthew Hause et al. "The SysML Modelling Language", Fifth European Systems Engineering Conference, Sep. 18-20, 2006, 12 pages.*

Xiaojing Yuan, et al. "Real-Time Sensor Fusion Framework for Distributed Intelligent Sensors", 2002, American Association for Artificial Intelligence 6 pages.*

Di Wu et al. "A framework for fast 3D solid model exchange in integrated design environment",Computers in Industry 56 (2005) 289-304.*

Chi-Leung Fung et al. MOCS: an Object-Oriented Programming Model for Multimedia Object Communication and Synchronization,1994 IEEE, pp. 494-501.*

Karsai et al. "Model-Integrated Development of Embedded Software" Proceedings of the IEEE, vol. 91, No. 1 Jan. 2003, pp. 145-164.

* cited by examiner

METHOD, SYSTEM, AND COMPUTER PROGRAM PRODUCT FOR IMPLEMENTING A MODEL EXCHANGE FRAMEWORK GENERATING A SYNCHRONIZATION RECORD IN RESPONSE TO A MODEL EXCHANGE REQUEST USING FUSION TECHNOLOGY

The present application is related to U.S. patent application Ser. No. 11/966,381, entitled "METHOD, SYSTEM, AND COMPUTER PROGRAM PRODUCT FOR IMPLEMENTING EXTERNAL DOMAIN INDEPENDENT MODELING FRAMEWORK IN A SYSTEM DESIGN", filed on Dec. 28, 2007, which is hereby incorporated by reference in its entirety.

BACKGROUND OF THE INVENTION

Modern systems complexity is far greater than the capacity of any single individual. A typical system (as big as an aircraft or as small as a cell-phone) is designed by teams of specialists in some concurrent form. Such teams may include concept engineering, system architects, hardware, software and mechanical engineering teams, manufacturing, reliability, testing and field service experts among others. Each specialist team typically has its own workflow and set of tools. Furthermore, portions of the design process are often outsourced, creating a situation where the various specialists are geographically dispersed and are employed by different companies.

All these teams of specialists need to have a consistent and coherent view of the requirements, the design and the work plans. Design concerns typically cut across multiple disciplines. Consider for example an aircraft design case where the customer requests a particular feature, say an entertainment sub-system, to be installed. This impacts power requirements, alters the weight, requires additional software, hardware and mechanical interfaces and poses new manufacturing, reliability and field service challenges. Because of this interdependency, a design change by any one specialist typically perturbs the design of the whole system.

Therefore, there exists a growing need for collaborative engineering, where multiple teams are working concurrently to refine and optimize a system design. Such work can only be done effectively if each team member has access to up-to-date information. Each team member should be able to assess the impact of his or her changes on the over-all design in order to ensure the design process is converging. These needs are emphasized in cases where team members are geographically and organizationally dispersed.

Moreover, for the design to converge quickly, each specialist needs to understand the effects of a design change on the overall system and needs to communicate the change in unambiguous terms to the rest of the design team. This need is not met by today's design environment for several reasons. Specification, architecture and planning information is typically distributed as text documents and engineering drafts. Such documents are open to interpretation and may contain ambiguities and contradictions. Formal engineering models are domain specific and are not shared between specialists. The software team, for example, has nor the tools neither the expertise to decipher the hardware design in order to detect a change in the SW/HW interface. Information in the form of either documents or formal models is often not shared on line because of lacking IT infrastructure or organizational issues such as mutual distrust between competing vendors for example. Hence critical changes are not propagated in a timely manner.

As a result of these deficiencies, the design process becomes much longer, problems are uncovered at the tail end of the process at integration phase. Recovery is very costly and the resulting design is sub-optimal and often misses some of its goals in terms of target market window, cost, reliability or feature set.

Furthermore, the lack of architecture, structures, and standards for system design and system engineering in general constitutes a major obstacle for the development of systems and often cause significant waste in resources and time which in turn negatively impact the time to market and therefore profitability due to problems in integration of various parts of the system. For example, the lack of architecture, structures, and standards for Electronic System Level (ESL) design and system engineering in general is a major obstacle for the development of automation tools.

In addition, what often worsens the above problems is that a diverse set of engineering tools are used in the process of system design, where each domain specialist is using a particular tool. Engineering tools typically represent a partial model of the design. Such models are formal in some sense—they can execute or simulate on a computer, or have some well understood mathematical foundation. Some examples of this diverse set of engineering tools comprise, for example, SysML tools, such as Rhapsody®, which are used by system engineers to capture an abstract functional description of the design, Simulink which is used by DSP, control, and algorithm designers to capture computational aspects of system components, reliability analysis tools, such as Relex®, which are used by reliability engineers to capture system possible failure modes and reliability predictions, structural modeling tools, such as Pro-Engineer® and SolidWorks®, which are used to model and construct the structural elements of a system, and analysis tools, such as ANSYS® and Abacus®, which are used to numerically analyze the mechanical and electromagnetic aspects of a system.

Such engineering tools can typically export their internal models to a domain specific format, often as a computer file. The formats tend to be all different, as are the underlying semantics of the different models. Moreover, design information needs to be shared among the various design teams and specialists doing the design. Building on the examples above, the structural information captured in a SysML model is required for the reliability analysis process. The assumptions about input/output relationships in a control algorithm design must be consistent with the SysML representation of communication between components. Furthermore, certain properties of the overall system can not be observed in any of the design tools because they may constitute emergent properties that only show up at the full system level. For example, two control algorithms that operate flawlessly when observed independently may nonetheless oscillate due to a non-obvious feedback loop when these two control algorithms are coupled together using, for example, the system level communication model.

The current approaches to address the above problems have their own drawbacks. For example, the WebDAV is arguably one of the most widely used synchronization scheme. WebDAV does not, however, address the need to co-synchronize data and program(s) among various design teams collaborating on the same system design.

Thus, it is an objective of various embodiments of the present invention to provide a model exchange scheme which synchronizes both the data and program aspects for the purpose of system design. In various embodiments, this method or system of synchronization of both the data and the program aspects, when optionally combined with user identification, access rights management, and automatic notification, addresses one of the most sever bottlenecks in system design as described above.

SUMMARY OF INVENTION

What is disclosed is a method, system, and computer program product for implementing model exchange by synchronizing models between multiple client software applications and communicating via one or more server software programs. The client(s) and server(s) are executing on a plurality of computers interconnected by a communication network. In some embodiments, at least one of the models synchronized constitutes an executable model.

In various embodiments of the invention, each client is characterized by or is capable of importing a model comprising both data and program, establishing a local copy of the model, synchronizing a model with a server, transmitting and receiving a minimal set of changes, modifying said model as desired, affecting the local copy of the model, and/or exporting said model as an external format as desired.

In various embodiments of the invention, the server program is characterized by or is capable of receiving and sending various versions of models from and to clients and other servers, while exchanging a minimal set of changes. The server maintains change information sufficient to construct any model for all synchronized clients.

BRIEF DESCRIPTION OF THE FIGURES

The accompanying drawings are included to provide a further understanding of the invention and, together with the Detailed Description, serve to explain the principles of the invention. Moreover, the drawings illustrate the design and utility of various embodiments of the invention. It should be noted that the figures are not drawn to scale and that elements of similar structures or functions are represented by like reference numerals throughout the figures. In order to better appreciate how the above-recited and other advantages and objects of various embodiments of the present inventions are obtained, a more particular description of various embodiments of the present inventions briefly described above will be rendered by reference to specific embodiments thereof, which are illustrated in the accompanying drawings. Understanding that these drawings depict only exemplary embodiments of the invention and are not therefore to be considered limiting of its scope, various embodiments of the invention will be described and explained with additional specificity and details through the use of the accompanying drawings in which.

DETAILED DESCRIPTION

A detailed description of one or more examples is provided below along with accompanying figures. The detailed description is provided in connection with such examples, but is not limited to any such particular examples. Numerous specific details are set forth in the following description in order to provide a thorough understanding of various embodiments of the subject matters of the invention. These specific details are provided for illustrative purposes and the described techniques may be practiced according to the claims without some or all of these specific details. For example, some embodiments described below refer to various methods or systems for implementing the fusion technology in a single server environment for illustrative purposes and thus do not intend to limit the application of the present invention to such a single server environment and should not be limited as such. For the purpose of clarity, technical material that is known in the technical fields related to the examples has not been described in detail to avoid unnecessarily obscuring the description.

Various embodiments of the present invention are generally directed to a method, system, and computer program product for providing a consistent framework containing design requirements, specifications and project management data for system design. In other words, this invention addresses the problem of specification ambiguity and domain specific models, by enabling the exchange of formal engineering models between different domain experts. Various embodiments of the invention of fusion technology achieve various objectives without requiring any external design tool compliance. That is, various embodiments of the invention achieve the objectives without requiring any of formal engineering models to be directly or indirectly coded or modeled in or with a particular programming language or semantics.

Figure 1:
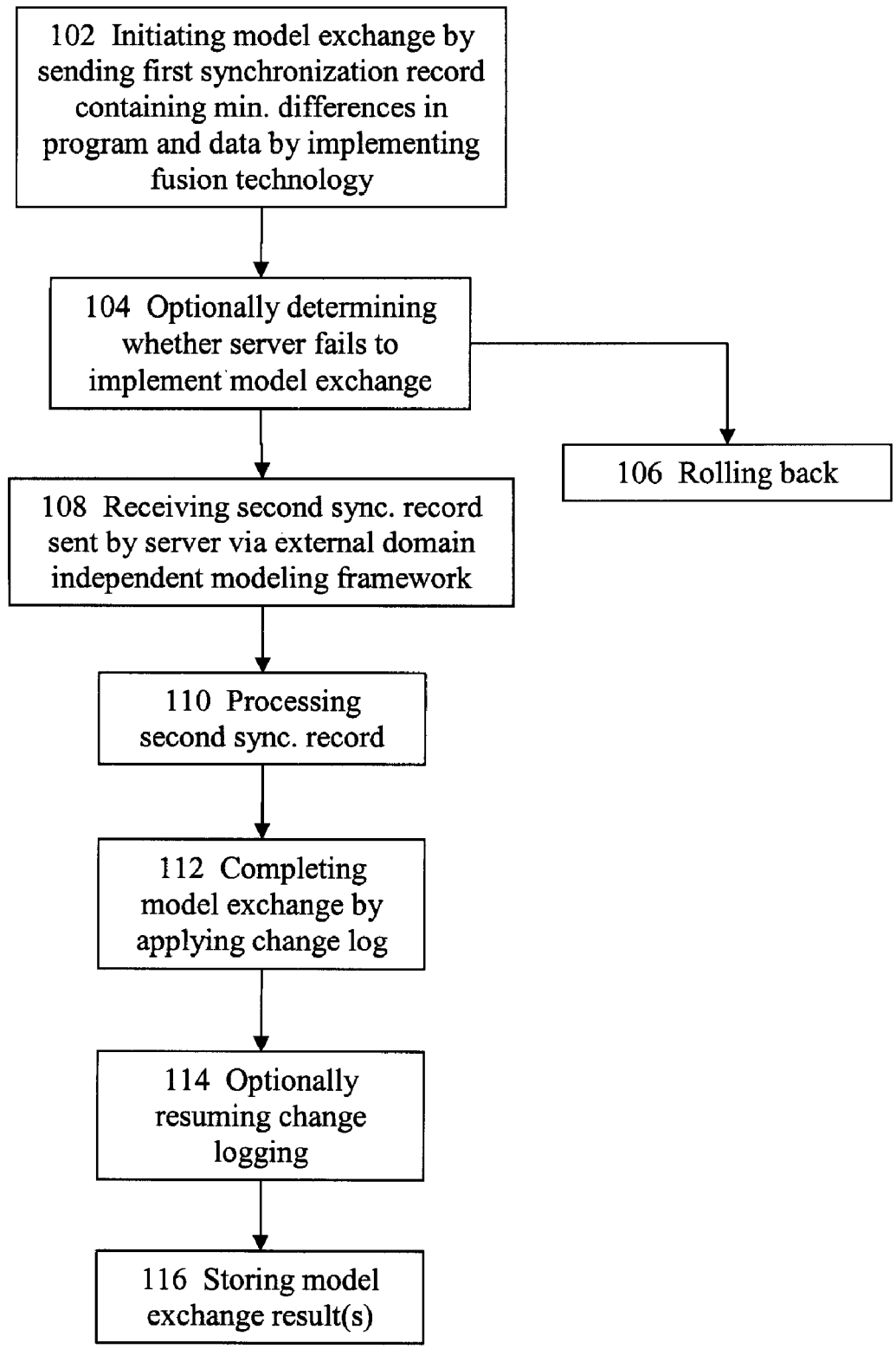
FIG. 1 illustrates the method or system for implementing model exchange initiated by a client.

Referring to FIG. 1 which illustrates the method or system for implementing model exchange initiated by a client. Note that the terms "client" and "server" used herein do not only describe an arrangement used on local area networks (LANs) or wide area networks (WANs) that makes use of distributed intelligence to treat both the server and the client as intelligent, programmable devices but also describe the situation where the client, which may be a member of a class, uses one or more services of the server, which may be a member of another class to which the client is not related.

In some embodiments within the context of the application of the method or the system for implementing external domain independent modeling framework, which is described in full details in U.S. patent application Ser. No. 11/966,981, entitled "METHOD, SYSTEM, AND COMPUTER PROGRAM PRODUCT FOR IMPLEMENTING EXTERNAL DOMAIN INDEPENDENT MODELING FRAMEWORK IN A SYSTEM DESIGN", filed on Dec. 28, 2007, which is hereby incorporated by reference in its entirety, the server represents a computing node on which the internal common modeling framework resides. Therefore, the server and client used herein may represent two standalone computing nodes in a distributed environment or the client may be a task, a process, a job, an application, or a thread residing on the same computing node as does the internal common modeling framework and using services from another part of the computing node representing the "server."

At 102, the method or the system in some embodiments of the invention initiates, by the client, model exchange by sending, to the server, the first synchronization record which comprises the "deltas" in both the program aspect and the data aspect, if both are determined to exist. In various embodiments of the invention, the deltas comprise minimal differences in both the program aspect and the data aspect, if both are determined to exist, between the client's model and the corresponding model on the server. Furthermore, in various embodiments of the invention, the first synchronization record comprises a list of new objects created by the client, a change log, and/or the maximum luid (local unique identifier which constitutes a symbolic reference) used by the client. In various embodiments of the invention, the terms "object" and "component" are used interchangeably, and both refer to a feature in the system design. In some embodiments of the invention where the system design is based upon object oriented programming paradigm, the object or the component represents an object in the object oriented programming paradigm, which, in some embodiments, refers to a language mechanism for binding data with methods that operate on that data.

In some embodiments of the invention within a single address space, each object is allocated an address in memory which may serve as the object's unique identifier. In some other embodiments of the invention in a distributed or persistent setting, persistent objects outlive the process that created them, and they also outlive that process's address space. Therefore, when an object becomes persistent the client allocates the luid which is independent of an object's memory address and therefore remains valid across multiple invocations of the client over time.

In some other embodiments of the invention in a distributed system, the client, as well as other individual clients, is unaware of the activities of other clients' and have no way of telling whether a given luid has already been used by another client. Therefore, an luid is not suitable as a globally unique identifier (guid). Only the server can reliably allocate a guid for an object. The server does this when it first becomes aware of a new persistent object even though the server does not generally introduce new persistent objects. Therefore, when the client relays its change set to the server, all objects are identified via luids. The server must map these guids (allocating new guids for new persistent objects). When the server communicates an update back to a client, it must perform the inverse mapping, describing all objects to the client via their luids.

In one embodiment of the invention, the method or the system sends the first synchronization record to the server by implementing an external domain independent modeling framework. More details about the implementation of the method or the system for implementing external domain independent modeling framework are described in U.S. patent application Ser. No. 11/966,981, entitled "METHOD, SYSTEM, AND COMPUTER PROGRAM PRODUCT FOR IMPLEMENTING EXTERNAL DOMAIN INDEPENDENT MODELING FRAMEWORK IN A SYSTEM DESIGN", filed on Dec. 28, 2007.

At 104, the method or the system of some embodiments of the invention may optionally determine or cause to determine whether the server fails to implement the model exchange. For example, the model or the system in one embodiment of the invention may perform a consistency check on the corresponding model on the server to determine whether the model on the client matches the corresponding model on the server. Various other methods may be used to determine whether the server successfully implements the model exchange and will not be described in greater details. Where it is determined that the server fails to successfully implement the model exchange initiated by the client, the method or the system in some embodiments of the invention performs a roll back at 106. Where it is determined that the server successfully implement the model exchange initiated by the client, the method or the system in some embodiments of the invention proceeds to 108 to receive a second synchronization record which is sent by the server in response to the first synchronization record. In some embodiments of the invention, the method or the system receives the second synchronization record by implementing the fusion technology.

At 110, the method or the system in some embodiments of the invention processes the second synchronization record sent by the server. At 112, the client completes the model exchange by applying the change log. In some embodiments of the invention, the method or the system dynamically modifies objects so that they log changes when they become persistent; that is, when they become reachable from the set of synchronizable roots upon the first synchronization. In some embodiments, when an object becomes persistent, its class is replaced with a persistent class. The persistent class is identical to the original class, except that its setter methods log changes.

Moreover, in some embodiments all local states or all local variables are required to be accessed via accessor methods (getters and setters). A getter is a method which is responsible for relaying information about an object's state by returning the value of one of its variables. Getter method allows other classes to read but not change the values of the attributes and constitute methods that return the value to the attribute. A setter is a method that transforms the state of an object by setting the value of one of its variables. Setter methods allow other objects to change the state of an object. An accessor method allows other classes to read but not change the values of the attributes. In some embodiments, standard Smalltalk is used to allow direct access to instance variables. In some embodiments, the method or system relies on coding conventions to ensure that all instance variable access goes through accessors. Where the change logging on the client was optionally stopped at the initiation of the model exchange, the method or the system in some embodiments of the invention resumes the change logging at the client at 114.

Figure 2:
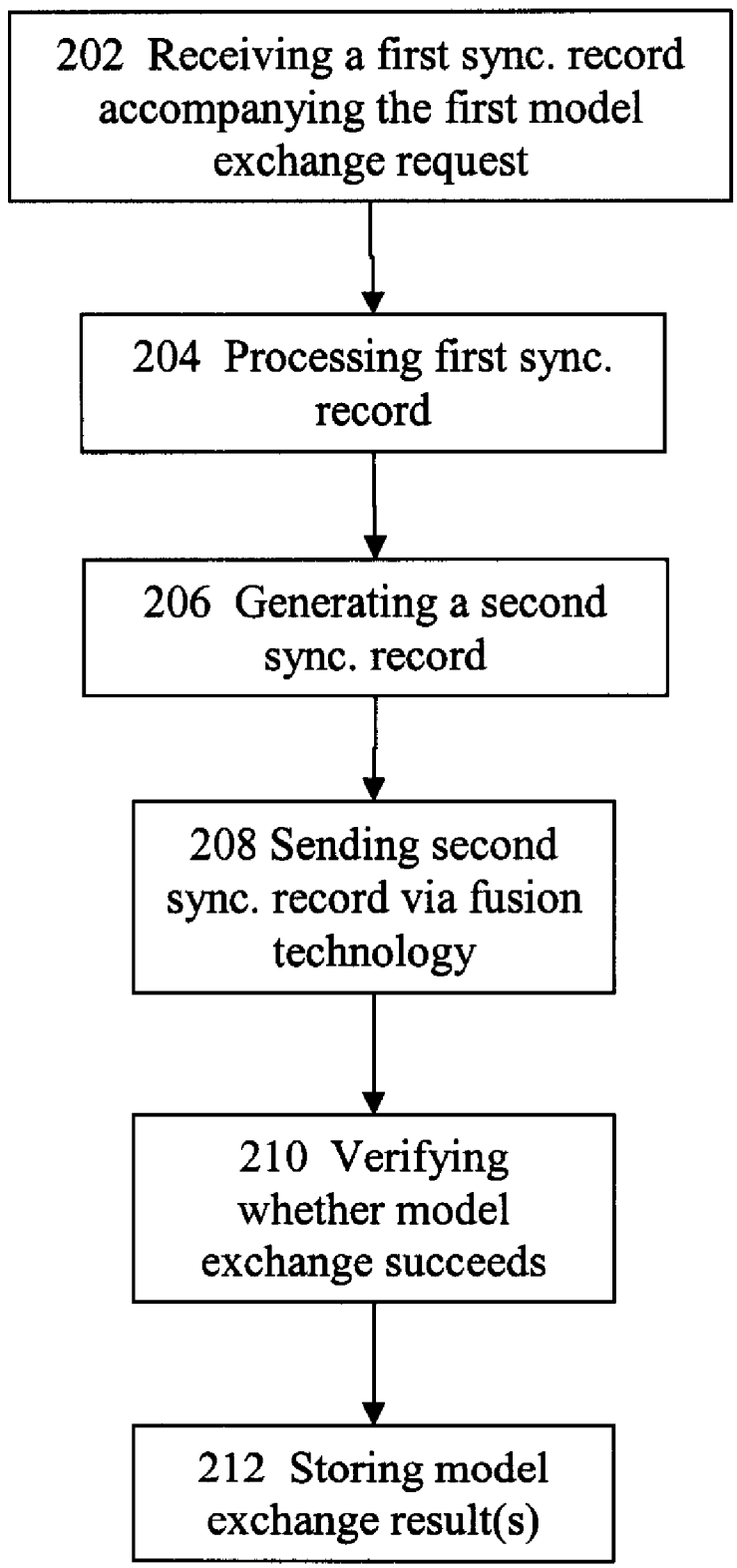
FIG. 2 illustrates the method or system for implementing model exchange initiated by a client.

Referring to FIG. 2 which illustrates the method or system for implementing model exchange initiated by a client. At 202, the method or the system in some embodiments of the invention receives a first synchronization record accompanying the model exchange request initiated by a client. At 204, the method or the system in some embodiments of the invention processes the first synchronization record.

At 206, the method or the system in some embodiments of the invention generates a second synchronization record in response to the first synchronization record. In some embodiments of the invention, the second synchronization record comprises one or more of a table or a list of new objects created by other clients, a change log for updating existing objects of the client to the correct state, or one or more objects which are not reachable by the client but are connected to the particular client's heap by the changes to the model made by the client and contained in the first synchronization record. In various embodiments of the invention, the second synchronization record comprises the deltas, i.e., the minimal difference in both the program aspect and the data aspect between the model(s) on the server and the corresponding model(s) on the client. In one embodiment of the invention, the server assigns the luids (local unique identifiers) to the new objects based upon the maximum number of luids transmitted in the first synchronization record to the server by the client. In one embodiment of the invention, the second synchronization record is encoded in XML.

At 208, the method or the system in some embodiments of the invention sends the second synchronization record to the client. In some embodiments of the invention, the method or the system sends the via the fusion technology.

At 210, the method or the system in some embodiments of the invention may optionally verify whether the model exchange has been implemented successfully.

At 212, the method or the system in some embodiments of the invention display the model exchange result(s) or store the result(s) in a tangible computer readable medium.

Figure 3A:
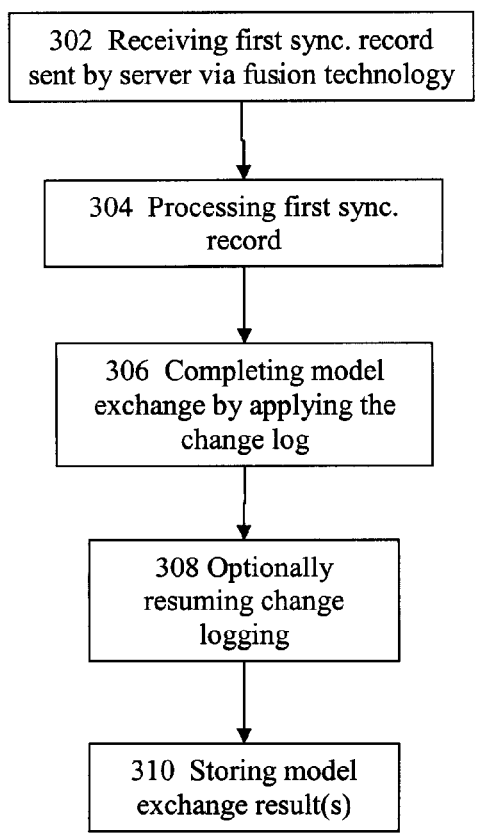
FIG. 3a illustrates the method or system for implementing model exchange initiated by a server on a client.

Referring to FIG. 3a which illustrates the method or system for implementing model exchange initiated by a server on a client. These embodiments may illustrate the situations such as where the server has received and implemented one or more model exchange requests from one or more client nodes and determines that it may be necessary to synchronize various models on other clients or where the server determines, based upon criteria such as various clients' activities on the server, that various models on various clients may be outdated and need to be synchronized with the current model on the server. At 302, the method or the system in some embodiments of the invention receives a first synchronization record which is sent by a server. In some embodiments, the method or the system receives the first synchronization record sent by the server by utilizing or implementing the fusion technology. At 304, the method or the system in some embodiments of the invention processes the first synchronization record. More details about processing a synchronization record on the server will be described in subsequent sections and will not be repeated here.

At 306, the method or the system in some embodiments of the invention completes the model exchange by applying the change log. In some embodiments of the invention, the method or the system may reject the model exchange. For example, the method or the system may reject the model exchange initiated by the server in situations where the client is currently undergoing some design changes in some embodiments, where the client is unavailable to perform or implement, in some other embodiments, the model exchange due to the current performance of, for example, some maintenance tasks or some database operations such as committing some database transactions, where the client currently has its change logging turned on, or where the client determines that no model exchange is needed after it determines that the model(s) on itself (the client) is current.

Where the method or the system rejects the model exchange initiated by the server in some embodiments, the method or the system may subsequently initiate a model exchange by sending a new synchronization record to the server once the situations or reasons for its rejection of the server's model exchange are removed in one embodiment. In another embodiment where the client first rejects the model exchange initiated by the server, the client does not subsequently initiate a model exchange, rather, the client awaits the next model exchange initiated by the server.

At 308, the method or the system in some embodiments of the invention may optionally resume change logging in situations where the method or the system has previously determined to optionally turn off change logging. Change logging may be needed to log changes during manipulation of the model(s). At 310, the method or the system in some embodiments of the invention displays the model exchange result(s) and/or stores the model exchange result(s) in a tangible computer readable medium.

Figure 3B:
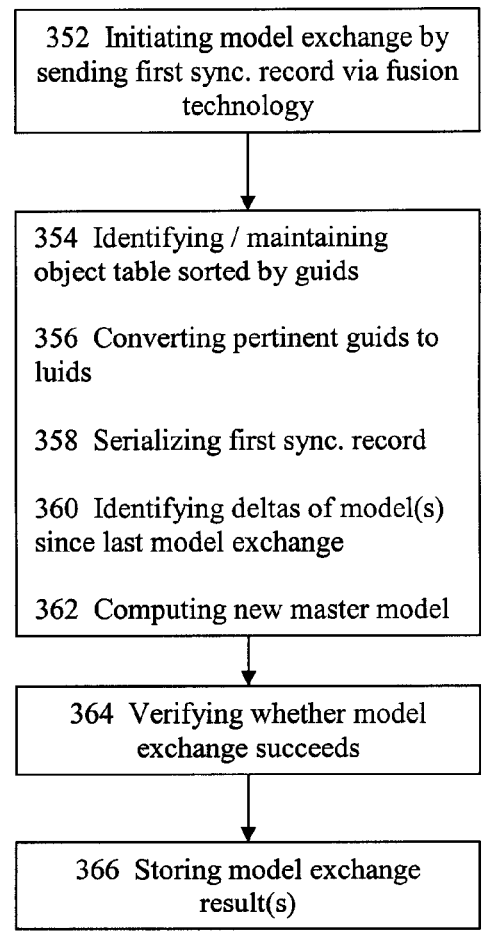
FIG. 3b illustrates the method or system for implementing model exchange initiated by a server on the server.

Referring to FIG. 3b which illustrates the method or system for implementing model exchange initiated by a server on the server. These embodiments may illustrate the situations such as where the server has received and implemented one or more model exchange requests from one or more client nodes and determines that it may be necessary to synchronize various models on other clients or where the server determines, based upon criteria such as various clients' activities on the server, that various models on various clients may be outdated and need to be synchronized with the current model on the server.

At 352, the method or the system in some embodiments of the invention initiates model exchange by sending a first synchronization record. Similarly, the first synchronization record comprises the "deltas" in both the program aspect and the data aspect, if both are determined to exist. In various embodiments of the invention, the deltas comprise minimal differences in both the program aspect and the data aspect, if both are determined to exist, between the client's model and the corresponding model on the server. Furthermore, in various embodiments of the invention, the first synchronization record comprises a list of new objects created by the client, a change log, and/or the maximum luid (local unique identifier which constitutes a symbolic reference) used by the client. In some embodiments of the invention, the method or the system initiates model exchange by sending the first synchronization record by applying or implementing the fusion technology.

In addition to initiating model exchange by sending the first synchronization record at 352, the method or the system in some embodiments of the invention performs one or more of actions of identifying or maintaining a global object table of 354, converting one or more guids (global unique identifiers) to luids (local unique identifiers) of 356, serializing the first synchronization record of 358, identifying deltas of model(s) for one or more particular clients based on the last model exchange(s) for each of the respective one or more particular clients of 360, and computing a new master model based upon, for example, model exchange(s) received previously from other clients of 362.

In some embodiments of the invention, the global object table comprises all the objects used in the entire design and entries of each of the objects. In some embodiments, the global object table entries for a particular object in the table comprise a list of changes made to that particular object. In one embodiment, each change is a SyncObjChangeRecord object or instance which indicates which object this particular change modifies, at which anchor the change was made, and/or a change descriptor of type, which, in one embodiment, comprise an object or an instance of SyncChange. The entries of each object may comprise the anchor, which represents the representation of a client which first created and/or last modified the object, the initial state of the object, and/or a list of changes to the object. In some embodiments of the invention, the global object table may be sorted by the guids.

In one embodiment of the invention, the method or the system serializes the first synchronization record by respectively serializing the objects in question into XML using a library called SIXX. In another embodiment of the invention, the method or the system serializes the first synchronization record by using the class SyncAgent which encapsulates a remote command protocol for communicating among the server and various clients. In some embodiments, the method or the system may cause the server to assign luids to these objects based upon the previous maximal luid value received from a particular client.

At 364, the method or the system in some embodiments of the invention may optionally verify whether the model exchange is implemented successfully. At 366, the method or the system in some embodiments of the invention displays the model exchange result(s) to the users or designers or store the model exchange result(s) in a tangible computer readable medium.

Figure 4:
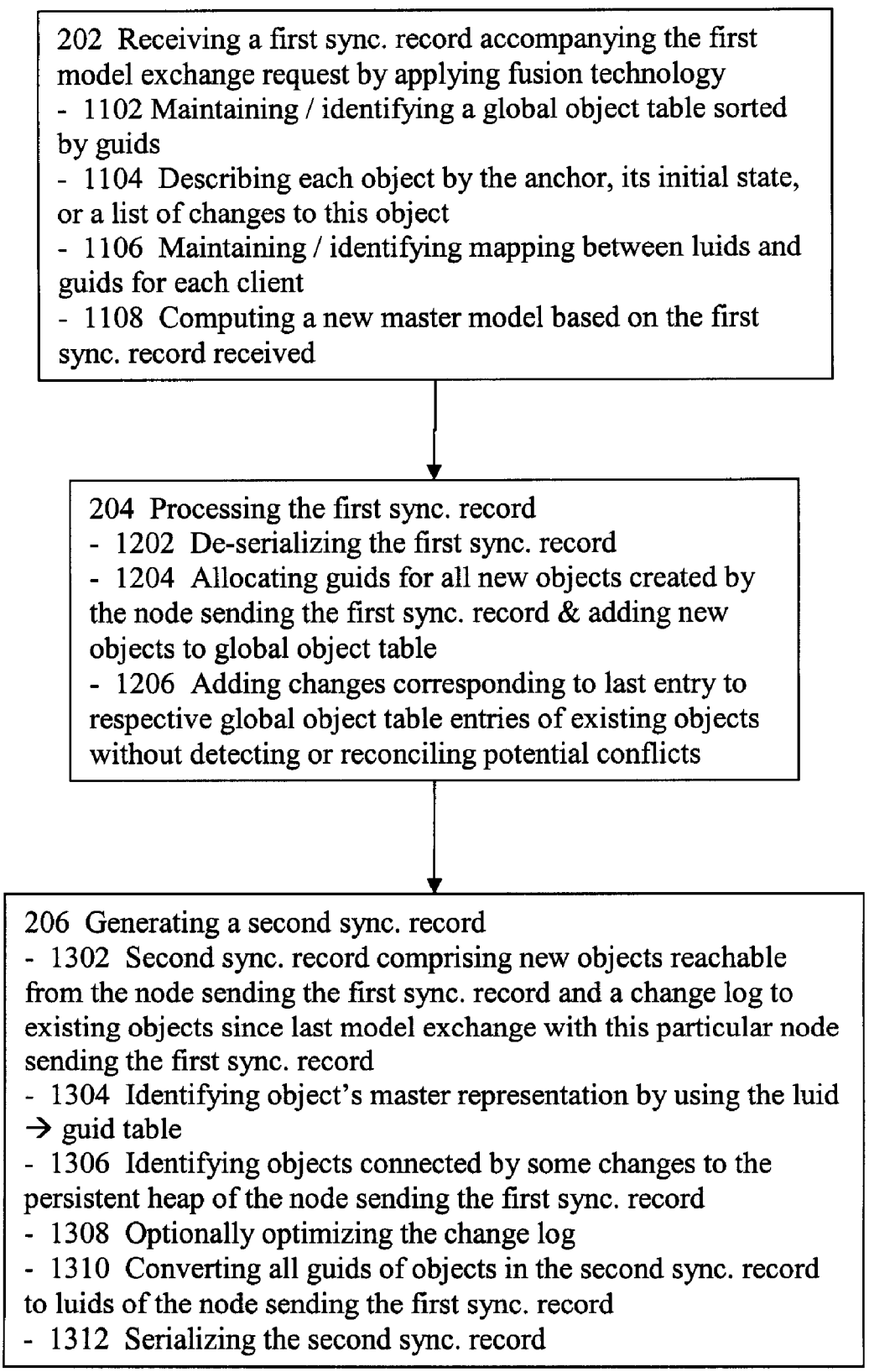
FIG. 4 illustrates more details of the method or system for implementing model exchange initiated by a client as described in FIG. 2.

Referring to FIG. 4 which illustrates more details of the method or system for implementing model exchange initiated by a client as described in FIG. 2. In addition to receiving a first synchronization record accompanying the model exchange request initiated by a client at 202, the method or the system performs one or more of the actions of 1102, 1104, 1106, 1108. In some embodiments, the method or the system may further maintain or identify a global object table at 1102.

In some embodiments, this global object table is sorted by guids (global unique identifiers) of the objects used in the master model. In some embodiments, the global object table is stored as a database which comprises one or more primary keys. In one embodiment, the guids (global unique identifiers) may be used as the one or more primary keys. In some embodiments, the global object table comprises all the objects used in the entire design and entries of each of the objects. In some embodiments, the global object table entries for a particular object in the table comprise a list of changes made to that particular object. In one embodiment, each change is a SyncObjChangeRecord object or instance which indicates which object this particular change modifies, at which anchor the change was made, and/or a change descriptor of type, which, in one embodiment, comprise an object or an instance of SyncChange. The entries of each object may comprise the anchor, which represents the representation of a client which first created and/or last modified the object, the initial state of the object, and/or a list of changes to the object. In some embodiments of the invention, the global object table may be sorted by the guids.

In addition to or in the alternative, the method or the system of some embodiments of the invention may, at 1104, describe each object by the anchor, the object's initial state, or a list of changes to the object. In addition to or in the alternative, the method or the system of some embodiments of the invention may, at 1106, maintain a mapping between the luids (local unique identifiers) and the guids (global unique identifiers). In some embodiments, the method or the system may maintain two separate mappings one of which maps the luids of a particular client to their corresponding guids, and the other of which maps the guids to luids. In addition to or in the alternative, the method or the system of some embodiments of the invention may, at 1108, compute the new master model. In some embodiments, the method or the system employs the fusion technology in computing the new master model. In some embodiments, the action of computing the new master model is based on the first synchronization record received or previously received or any other synchronization records previously received.

In addition to processing the first synchronization record at 204, the method or the system performs one or more of the actions of 1202, 1204, and 1206. In some embodiments, the method or the system may further de-serialize the first synchronization record at 1202. In one embodiment of the invention, the method or the system serializes or de-serializes the synchronization records received by respectively serializing or de-serializing the objects in question into XML using a library called SIXX. In another embodiment of the invention, the method or the system serializes or de-serializes the synchronization records received by using the class SyncAgent which encapsulates a remote command protocol for communicating among the server and various clients.

Once de-serialized, the synchronization record received comprises new objects created by the client(s) and a change log which updates existing objects to the correct states. Note that in some embodiments the new objects may be allocated by the de-serialization action and thus need not be allocated otherwise even though all the reference they make are symbolic; these new objects may then be added to the luid or guid table, depending upon which entity receives the synchronization record. In some embodiments, the method or the system may cause the server to assign luids to these objects based upon the previous maximal luid value received from a particular client.

In addition to or in the alternative, the method or the system of some embodiments of the invention may, at 1204, allocate guids (global unique identifiers) for all new objects, if any, created by a particular client which sends a synchronization request. In some embodiments, the method or the system may, in addition or in the alternative, add these new objects to the global object table at 1204.

In addition to or in the alternative, the method or the system of some embodiments of the invention may, at 1206, add one or more changes corresponding to the last entry to the respective global object table entries of one or more existing objects. In some embodiments, the method or the system adds one or more changes to the respective global object table entries of one or more objects without detecting or reconciling any potential conflicts. Rather, the method or the system in these embodiments treats the latest synchronization or model exchange as the dominant synchronization or model exchange.

In addition to generating a second synchronization record at 206, the method or the system performs one or more of the actions of 1302, 1304, 1306, 1308, 1310, and 1312. In some embodiments, the second synchronization record comprises one or more new objects, if any, reachable from the entity which originally sent the first synchronization record or a change log or a list of changes to existing objects since the last model exchange with the particular client which originally sent the first synchronization record, 1302.

In some embodiments of the invention, the method or the system determines the change log by traversing all objects known to this particular client which first initiated the model exchange by sending the first synchronization record; then the method or the system lists each of such objects in the luid to guid mapping or table. In some embodiments of the invention, the method or the system uses the luid to guid mapping or table to look up a particular object's master representation on the server or within the internal common modeling framework. In some embodiments of the invention, the master representation of this particular object comprises the object as it was first created, the anchor at the time of creation, and a change list describing all the changes subsequently made to the particular object. In one embodiment of the invention, this may be implemented as an SyncObjRecord object or instance. In another embodiment of the invention, each change is associated with an anchor specifying when the change was made, and the change list is arranged in a chronological order such that all changes made after the last model exchange or synchronization between the server and a particular client can be added to the change log in the second synchronization record.

In addition to or in the alternative, the method or the system of some embodiments of the invention may, at 1304, identify an object's master representation by using the luid to guid mapping or table.

In addition to or in the alternative, the method or the system of some embodiments of the invention may, at 1306, identify one or more objects which are not reachable from this particular client's roots but are connected by one or more changes to the persistent heap of the client initiating the model exchange by sending the first synchronization record. In addition to or in the alternative, the method or the system of some embodiments of the invention may, also at 1306, further identify one or more objects which are reachable from the roots of the client initiating the model exchange yet are modified by some other clients. In some embodiments, the method or the system allocates an luid (local unique identifier) for each of these objects identified at 1306. In these embodiments of the invention, the method or the system thus identifies all the objects which affects the client initiating the model exchange by sending the first synchronization record but are changed by other clients.

In addition to or in the alternative, the method or the system of some embodiments of the invention may, at 1308, optionally optimize the change log which is part of the second synchronization record to ensure that no objects are gratuitously added to the persistent heap of this particular client which first initiated the model exchange by sending the first synchronization record.

In addition to or in the alternative, the method or the system of some embodiments of the invention may, at 1310, convert all guids (global unique identifiers) in the second synchronization record to luids (local unique identifiers) of a particular client which first initiated the model exchange by sending the first synchronization record. In some embodiments, this action of converting all guids to luids may be achieved by referencing to the guid to luid mapping or table.

In addition to or in the alternative, the method or the system of some embodiments of the invention may, at 1312, serializes the second synchronization record. In one embodiment of the invention, the method or the system serializes the synchronization records received by respectively serializing the objects in question into XML using a library called SIXX. In another embodiment of the invention, the method or the system serializes the synchronization records received by using the class SyncAgent which encapsulates a remote command protocol for communicating among the server and various clients. In some embodiments, the method or the system may cause the server to assign luids to these objects based upon the previous maximal luid value received from a particular client.

Figure 5:
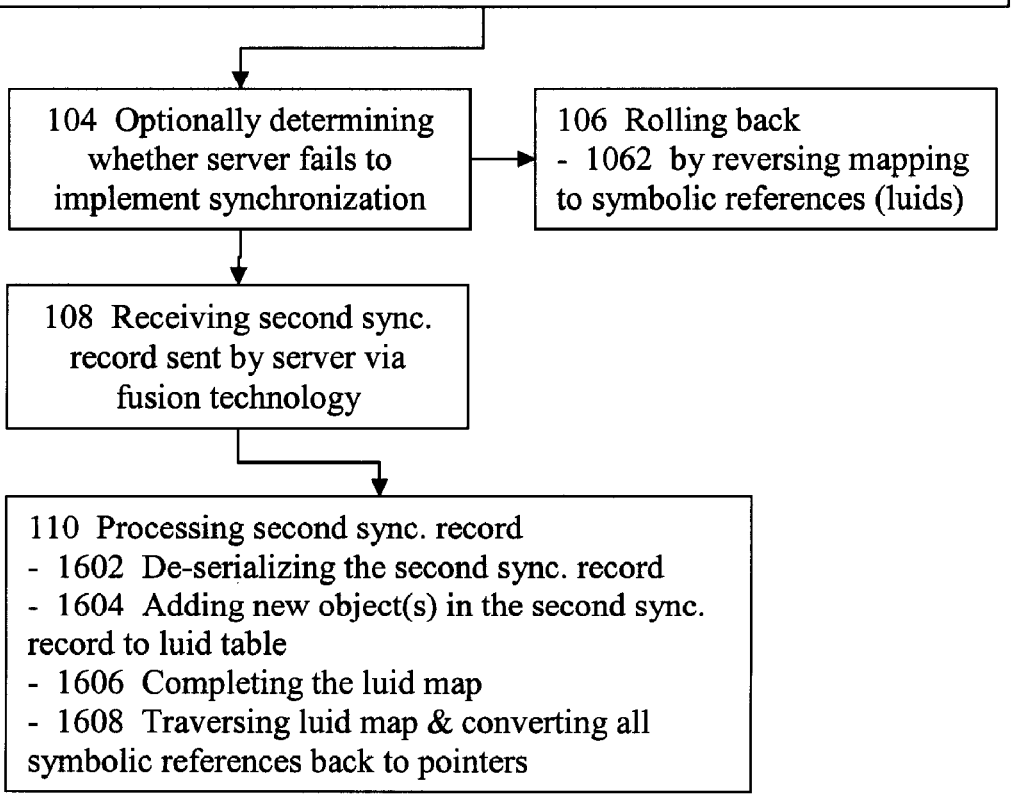
FIG. 5 illustrates more details of the method or system for implementing model exchange initiated by a client as described in FIG. 1.

Referring to FIG. 5 which illustrates more details of the method or system for implementing model exchange initiated by a client as described in FIG. 1. In addition to initiating model exchange by sending a first synchronization record at 102, the method or the system performs one or more of the actions of 1502, 1504, 1506, 1508, 1510, 1512, 1514, and 1516. In some embodiments, at 1502, the method or the system may further disable change logging to avoid infinite regression. In addition to or in the alternative, the method or the system of some embodiments of the invention may, at 1504, initiates model exchange by determining current set of persistent objects by recursively traversing from the roots. In addition to or in the alternative, the method or the system of some embodiments of the invention may, at 1506, identify an luid table which maps one or more objects used to luids (local unique identifiers.)

In addition to or in the alternative, the method or the system of some embodiments of the invention may, at 1508, employs the garbage collection which performs garbage collection on persistent data to ensure that the roots are guaranteed to be persistent. In addition to or in the alternative, the method or the system of some embodiments of the invention may, at 1510, examines or processes each non-transient field of one or more persistent objects. In some embodiments of the invention, the method or the system examines or processes each non-transient field by replacing the non-transient field's original object reference with a special SyncIdRef object which gives the original object's luid. Replacing the replacing the non-transient field's original object reference with a special SyncIdRef object also converts, at 1514, the persistent heap to use uids (unique identifiers) such that the persistent heap may be sent to the server as part of the same traversal which further determines which objects are persistent. In some embodiments of the invention, the method or the system uses the traversePersistent:visited: method for converting the persistent heap to use uids. The traversePersistent:visited: method goes thru non-transient instance variables of an object, invoking a closure which is passed as the first argument for the method on each variable and replacing the value of the variable with the result of the closure. Moreover, the traversePersistent:visited: method uses the map of visited objects passed as its second argument to avoid processing objects previously seen.

Where an object referenced by any of the non-transient fields, the method or the system of some embodiments of the invention may, at 1512, makes the object persistent. In some embodiments, the method or the system makes the one or more objects under examination persistent by changing its class to an equivalent persistent class. In one embodiment of the invention, the method or the system keeps all the classes in a table to determine whether a given non-persistent class has a corresponding persistent class. In another embodiment of the invention where it is determined that no persistent class exists for a given non-persistent class, the method or the system creates and store, in the table, the persistent class corresponding to this non-persistent class. In some embodiments, the action of changing the object's class to an equivalent persistent class comprises allocating an luid (local unique identifier) for the object, creating an entry for the luid in the luid table, or adding the object which is just made persistent to a list of newly persistent objects. In one embodiment of the invention, the method or the system includes the list of newly persistent objects in the first synchronization record. In some embodiments of the invention, the method or the system batches and converts these newly persistent objects en masse via a group "become:".

In addition to or in the alternative, the method or the system of some embodiments of the invention may, at 1516, update the luid mapping or table to capture recursive processing of the persistent roots while abstracting a function which processes individual field(s). In some embodiments of the invention, the method or the system assumes no formal notion of persistent or transient fields. Rather, the method or the system in these embodiments identifies one or more fields for processing via a hack where if it is determined that the object stored in the field answers true to isPersistent, the method or the system processes the field. Furthermore, in some embodiments of the invention, the method or the system first copies the luid map before traversing the luid map to preserve a copy of the luid map. Moreover, in some embodiments of the invention, the method or the system link II persistent objects via symbolic references or via luids. Moreover, the method or the system in some embodiments of the invention use the list of new objects accumulated during traversal as data to be passed to the server by interlinking all the newly persistent objects via symbolic identifiers. In some other embodiments of the invention, the method or the system applies the same to any objects referenced in the change log.

In addition to processing the second synchronization at 110, the method or the system performs one or more of the actions of 1602, 1604, 1606, and 1608. In some embodiments, the method or the system may further de-serialize the second synchronization record at 1602. In one embodiment of the invention, the method or the system de-serializes the synchronization records received by de-serializing the objects in question into XML using a library called SIXX. In another embodiment of the invention, the method or the system de-serializes the second synchronization record received by using the class SyncAgent which encapsulates a remote command protocol for communicating among the server and various clients.

Once de-serialized, the second synchronization record received comprises new objects and a change log which updates existing objects to the correct states. Note that in some embodiments the new objects may be allocated by the de-serialization action and thus need not be allocated otherwise even though all the reference they make are symbolic; these new objects in the second synchronization record may then be added to the luid table at 1604. In some embodiments, the method or the system may cause the server to assign luids to these objects based upon the previous maximal luid value received from a particular client.

In some embodiments of the invention, the method or the system then completes the luid map by determining whether the luid map contains all the new objects. In some embodiments of the invention, the method or the system traverses the luid map and converts all symbolic references back to pointers. In one embodiment of the invention, the symbolic reference represents a SyncIdRef object or instance. In one embodiment of the invention, the method or the system traverses the luid map and converts all symbolic references by using the traversePersistent:visited: method which searches the luid map for the object corresponding to the luid given in the symbolic reference.

Figure 6:
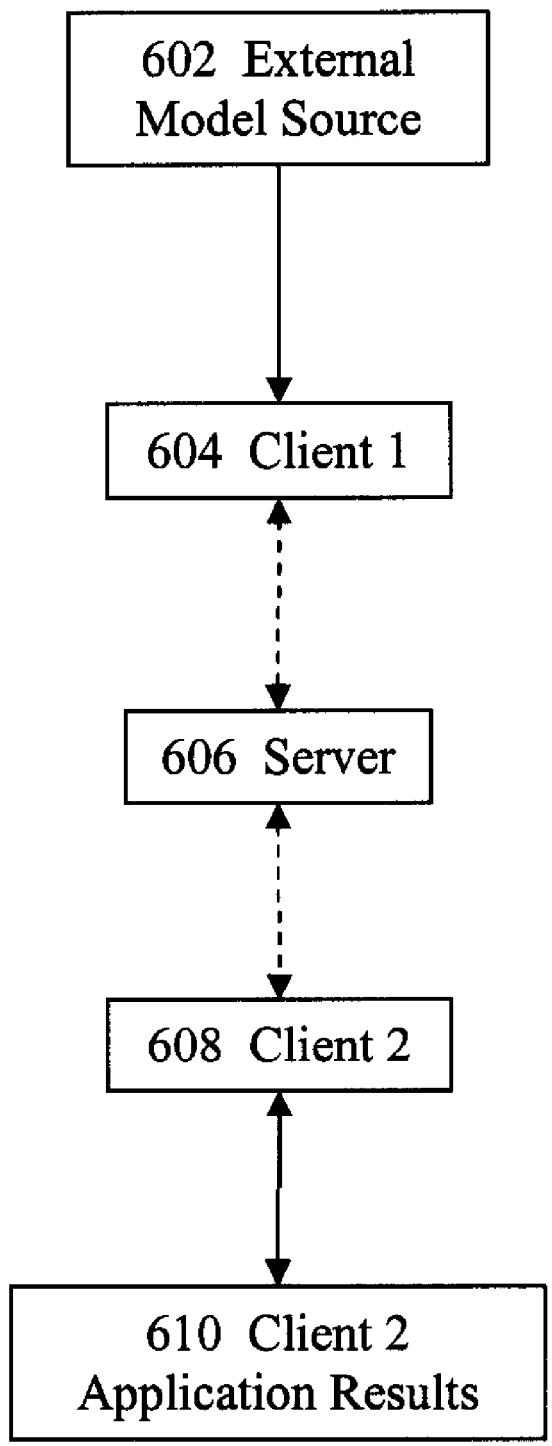
FIG. 6 illustrates an example of model exchange flow by employing one or more methods or systems previously described.

Referring to FIG. 6 which illustrates an example of model exchange flow by employing one or more methods or systems described above. In FIG. 6, the client 604 reads in or imports an external model source 602 where the external model source 602 is represented in both data aspect(s) and program aspect(s) in the client 1's modeling layer. Client 1 604 then initiates model exchange with the server 606 by sending a first synchronization record to the server to exchange deltas which encode a minimal difference in both the program and the data aspects between the model on client 1 and the corresponding model on the server. Client 1 then implements the model exchange by exchanging deltas which encode the newly imported model among other changes. Note that the model exchange between the server 606 and client 1 604 may be initiated by the server 606 by employing the method or the system as described in FIGS. 3a and 3b. The model exchange between the server 606 and client 1 604 may also be initiated by client 1 by employing the method or system as described in FIGS. 1-2 and 4-5.

Subsequently, client 2 608 synchronizes with the server 606 acquiring the imported model through model exchange. Note that the model exchange between the server 606 and client 2 608 may be initiated by the server by employing the method or the system as described in FIGS. 3a and 3b. The model exchange between the server 606 and client 2 608 may also be initiated by client 2 by employing the method or system as described in FIGS. 1 and 2. Client 2 may now perform various operations on the imported model. For example, client 2 may run an analysis application and produce a result file which is based upon the execution of the model imported. Note that, in some embodiments, client 2 never has access to the model's source. Also note that, in some embodiments of the invention, the communication links depicted by broken lines represent inter-process communication such as TCP/IP or other communication mechanisms suitable for transferring information between computer programs executing on separate computers.

Figure 7:
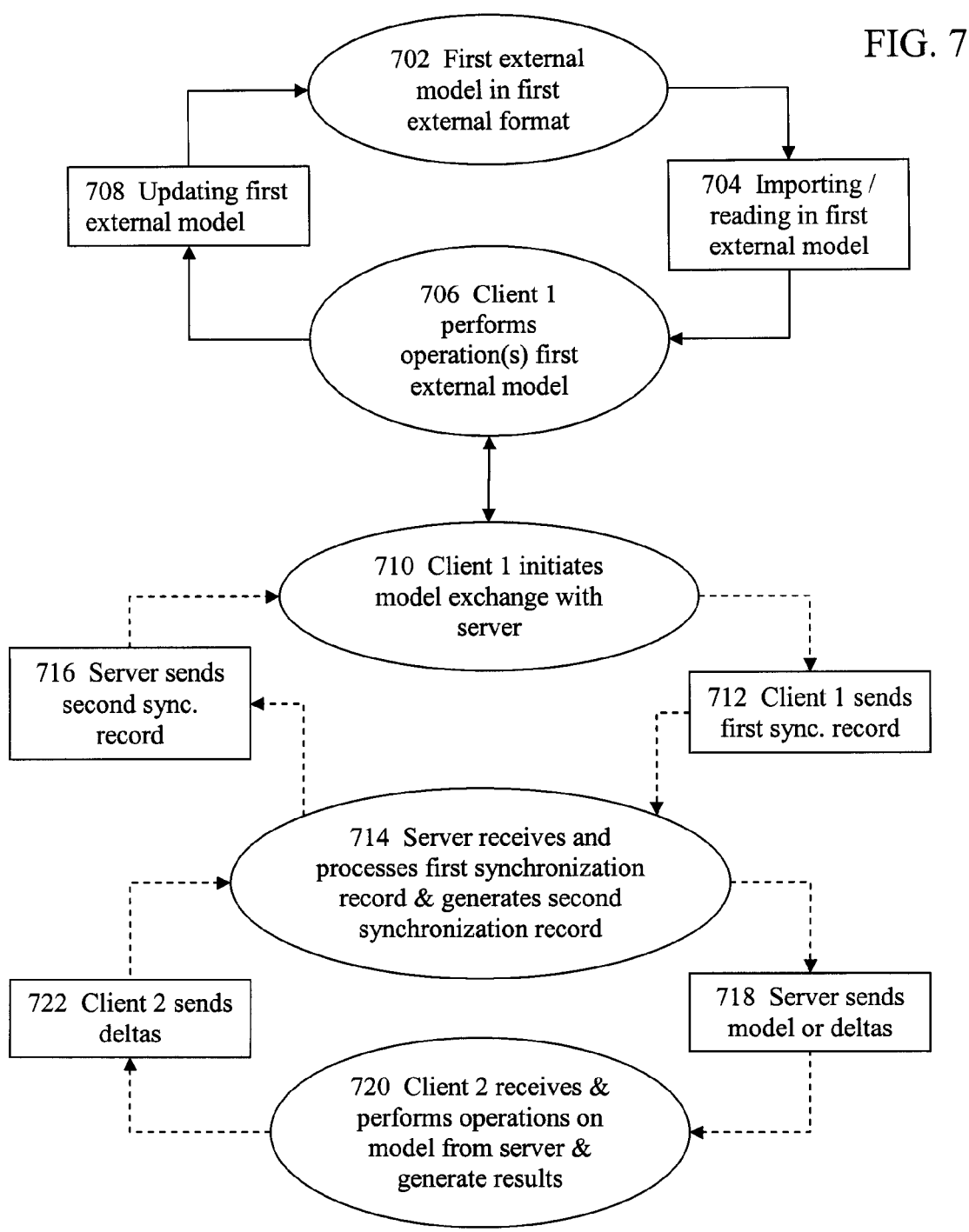
FIG. 7 illustrates another example of model exchange by employing one or more methods or systems previously described.

Referring to FIG. 7 which illustrates another example of model exchange by employing one or more methods or systems described above. In FIG. 7, the first external model in the first external format 702 is imported or read in, at 704, by client 1. Client 1 then performs various operations which cause some modifications to the first external model at 706. Client 1 then initiates model exchange with the server at 710 and sends the first synchronization record to the server at 712. Note that, in some embodiments of the invention, the communication links depicted by broken lines represent inter-process communication such as TCP/IP or other communication mechanisms suitable for transferring information between computer programs executing on separate computers. At 714, the server receives and processes the first synchronization record, computes the new master model, and generates a second synchronization record.

Before the model exchange initiated by client 1 at 710 is completed but after the last model exchange between the server and client 1, client 2, at 720, also receives the same external model and performs some operations on the first external model and generates some results which, for the purpose of this example, comprises changes to the first external model or to other objects which are not used in the first external model by client 1 but are connected to client 1's persistent heap by the changes. These changes made by client 2 are thus sent back to the server as a result of another model exchange between the server and client at 722. Note that this model exchange between the server and client 2 may be initiated by the server as described by FIGS. 3a and 3b or by client 2 as described by FIGS. 1-2 and 4-5. Therefore, at 714, the server generates the second synchronization record based on the new master model computed from both the first synchronization request received from client 1 at 712 and the changes sent by client 2 at 722.

Thereafter, the server sends the second synchronization record back to client 1 at 716 in response to the server's receipt of the first synchronization record from client 1. Client 1 then de-serializes the second synchronization record and completes the model exchange. Since the changes made by client 2 also affects the first external model used by client 1, client 1 may then update the first external model at 708 to accommodate such changes by client 2.

Figure 8:
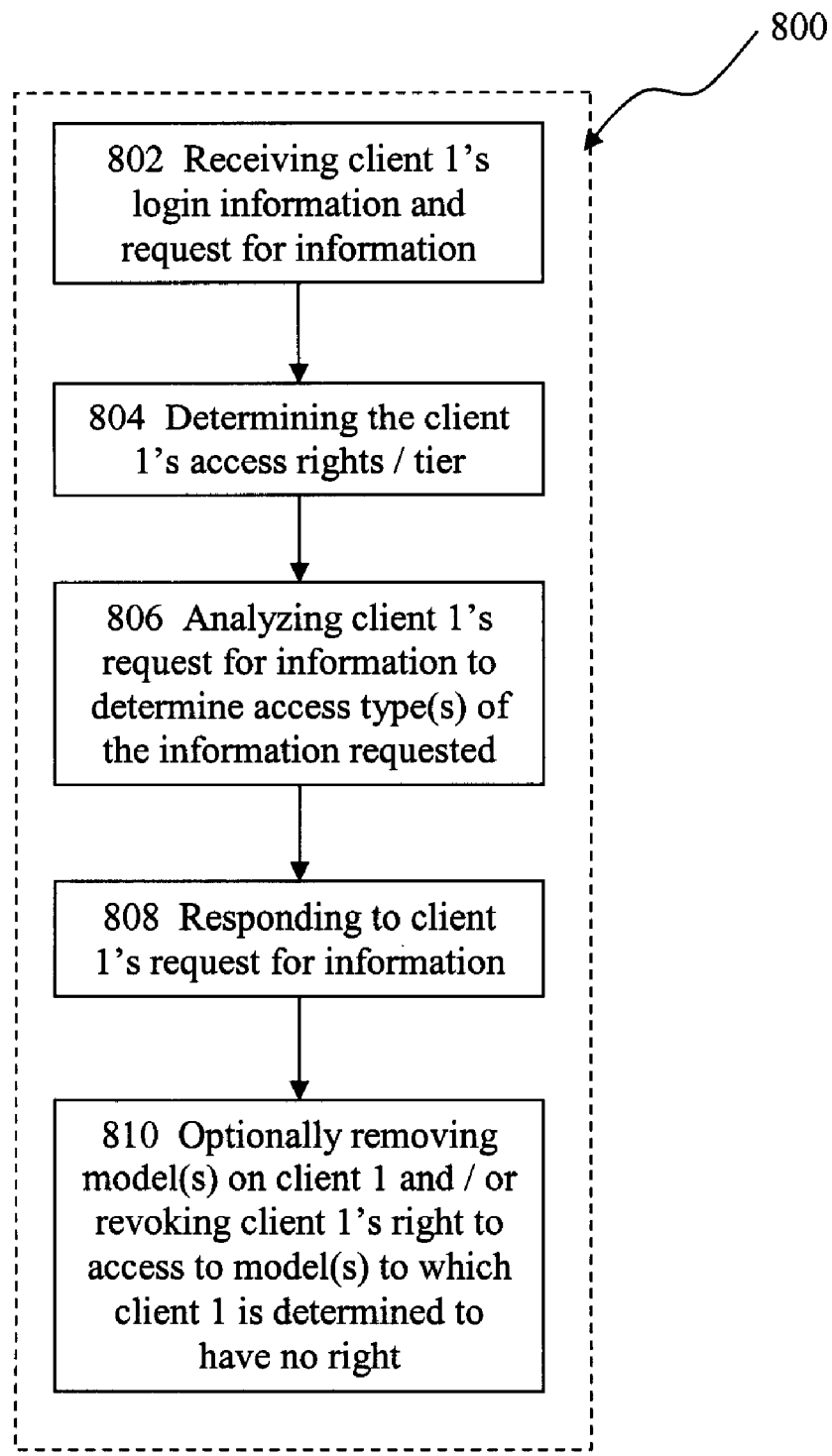
FIG. 8 illustrates a method or a system for implementing centrally managed sharing in model exchange.

Referring to FIG. 8 which illustrates a method or a system, 800, for implementing centrally managed sharing in model exchange. At 802, the method or the system in some embodiments of the invention receives client 1's login information such as client 1's login name, password, or other credentials as well as client 1's request for information from the server. At 804, the method or the system in some embodiments of the invention determines the access rights and/or tier of client 1 based upon information of client 1. In some embodiments, the information or the model residing on the server may be created in a tiered environment where different levels of details exposed to different clients depend upon the clients' respective tier. Moreover, each model or information is labeled, marked, or otherwise identified by the originator tier and/or user.

At 806, the method or the system of some embodiments of the invention analyzes client 1's request for information to determine the type(s) of access of the information requested by client 1. In some embodiments of the invention, the method or the system further divides the requested information into several parts and determines the type(s) of access for client on to each part of the entire information requested.

For example, the method or the system may divide the entire requested information into four parts and determines to grant client 1 full access including the right to read and write to the first part, partial access, including the right to read the source but not the right to write, to the second part, partial access, exposing only the inputs and outputs but not the source, to third part of the information requested, and no access to the fourth part of the information requested. Various other levels of details of access to the requested information may also be defined and implemented. The above example is only for illustration purposes and is not intended to limit the scope of this application.

At 808, the method or the system in some embodiments of the invention responds to client 1's request for information by providing all or part of the requested information based on the determination of access type(s) by client 1 to the requested information. In some embodiments of the invention, the method or the system only provides deltas that agree with the access rights and types previously determined. At 810, the method or the system of some embodiments of the invention may further optionally remove model(s) from client 1 and/or revoke client 1's right to access certain model(s) to which client 1 is determined to have no right. In one embodiment, the revocation or removal is based upon the information about client 1's access rights and/or tier previously determined.

This centrally managed sharing in model exchange is useful in many different settings. For example, the design may be created by an original equipment manufacturer (OEM), sourcing components from several suppliers. The OEM team should share some system models with the suppliers, to specify the environment in which their components need to operate. Each supplier should share models of its components with the OEM. At the same time, supplier models must not be shared with other suppliers, and some system level models must not be shared with any supplier.

Figure 9:
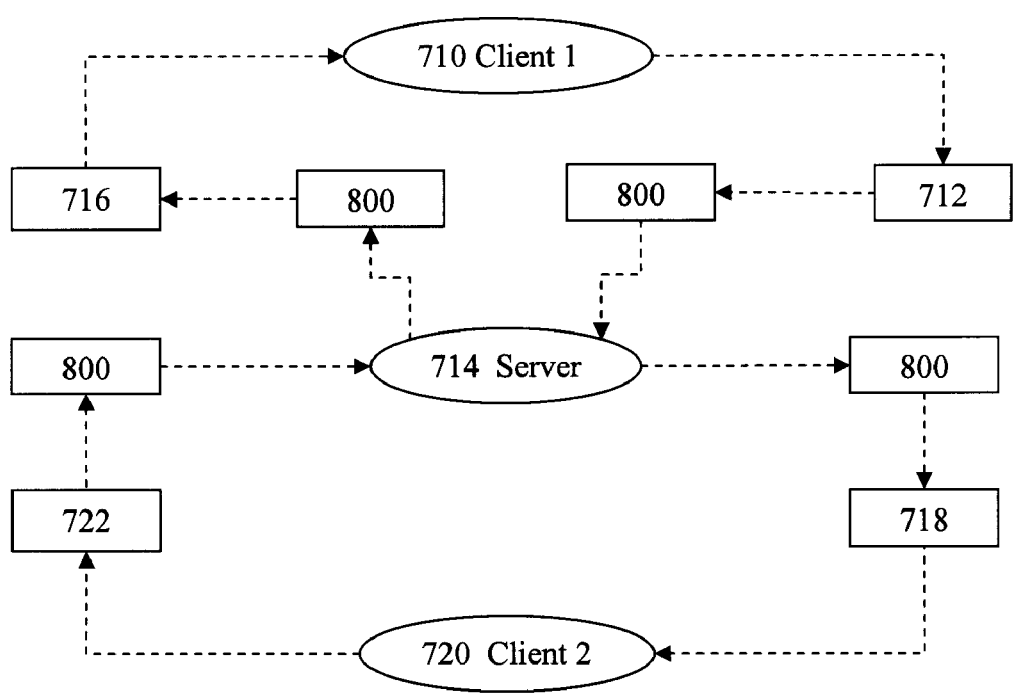
FIG. 9 illustrates an application of the centrally managed method or system in the model exchange flow.

Referring to FIG. 9 which illustrates an application of the centrally managed method or system 800 in the model exchange flow. For the purpose of simplicity and ease of explanation, FIG. 9 comprises the block representations for client 1, 710, the server, 714, and client 2, 720. For the same reasons, FIG. 9 comprises action blocks 712 and 722 which respectively represent some actions by client 1, 710, and client 2, 720. For example, 712 may comprise a request for information by client 1 or an initiation of model exchange with the server 714, and 722 may comprise a request for information by client 1 or an initiation of model exchange with the server 714. Similarly, FIG. 9 comprises action blocks 716 and 718 which respectively represent some actions directed respectively at client 1 and client 2 by the server, 714. For example, 716 may comprise sending a synchronization record which comprises the information requested by client 1 710, and 718 may comprise sending a synchronization record which comprises the information requested by client 2 720.

The centrally managed sharing method or system, 800, may be integrated into the model exchange flow at various different points where model exchanges occur between the server and client 1 and/or client 2.

For example, the centrally managed sharing method or system, 800, may be implemented, in some embodiments of the invention, to intervene between action 712 and the server 714 to determine whether client 1 has the appropriate access right(s) and/or belongs to the right tier to initiate a model exchange or to request for information from the server 712. As another example, the centrally managed sharing method or system, 800, may be implemented, in some embodiments of the invention, to intervene between the server 714 and action 716 to determine whether client 1 has the appropriate access right(s) and/or belongs to the right tier to receive the requested information or the synchronization record from the server 714. As another example, the centrally managed sharing method or system, 800, may be implemented, in some embodiments of the invention, to intervene between action 722 and the server 714 to determine whether client 2 has the appropriate access right(s) and/or belongs to the right tier to initiate a model exchange or to request for information from the server 714. As another example, the centrally managed sharing method or system, 800, may be implemented, in some embodiments of the invention, to intervene between the server 714 and action 718 to determine whether client 2 has the appropriate access right(s) and/or belongs to the right tier to receive the requested information or the synchronization record from the server 714.

System Architecture Overview

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 10:
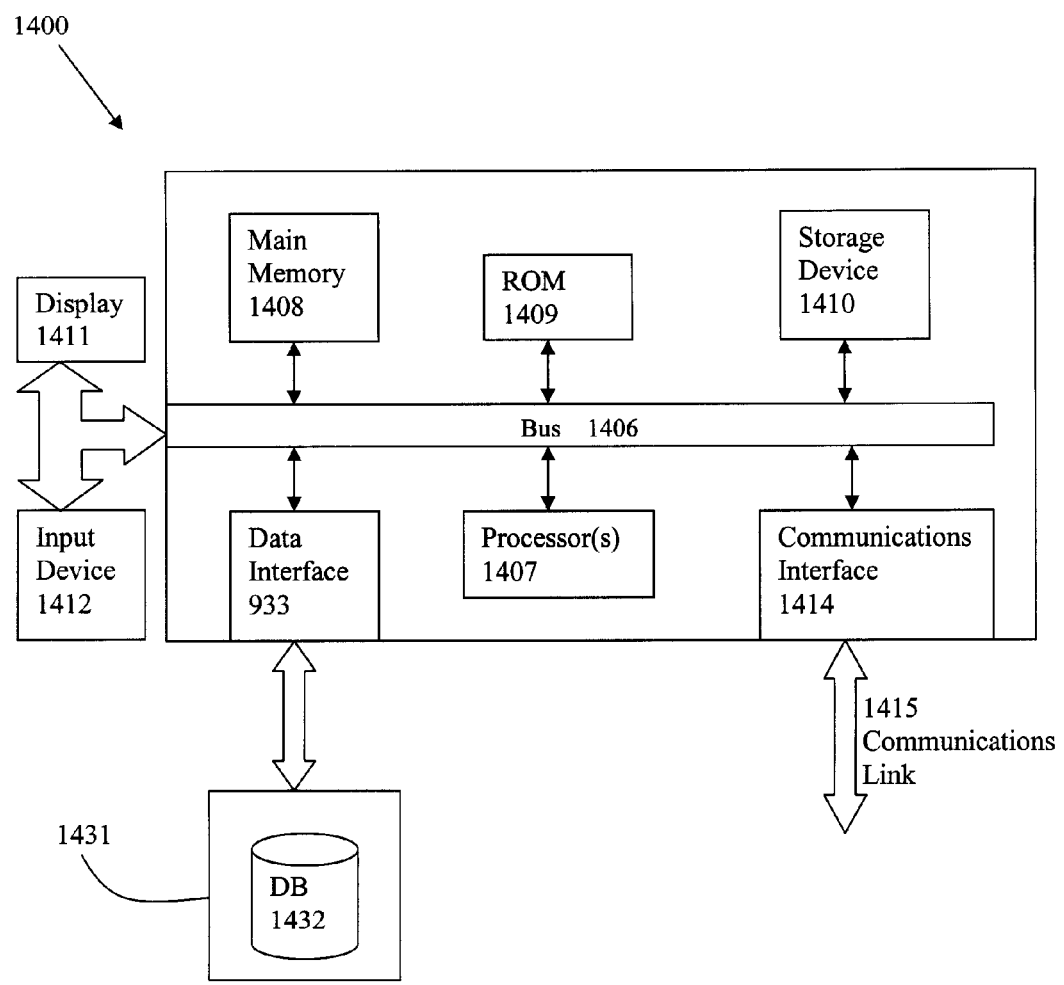
FIG. 10 depicts a computerized system on which a method for timing closure with concurrent process models can be implemented.

FIG. 10 is a block diagram of an illustrative computing system 1400 suitable for implementing an embodiment of the present invention. Computer system 1400 includes a bus 1402 or other communication mechanism for communicating information, which interconnects subsystems and devices, such as processor 1404, system memory 1406 (e.g., RAM), static storage device 1408 (e.g., ROM), disk drive 1410 (e.g., magnetic or optical), communication interface 1412 (e.g., modem or ethernet card), display 1414 (e.g., CRT or LCD), input device 1416 (e.g., keyboard), and cursor control 1418 (e.g., mouse or trackball).

According to one embodiment of the invention, computer system 1400 performs specific operations by processor 1404 executing one or more sequences of one or more instructions contained in system memory 1406. Such instructions may be read into system memory 1406 from another computer readable/usable medium, such as static storage device 1408 or disk drive 1410. In alternative embodiments, hard-wired circuitry may be used in place of or in combination with software instructions to implement the invention.

The term "computer readable medium" or "computer usable medium" as used herein refers to any medium that participates in providing instructions to processor 1404 for execution. Such a medium may take many forms, including but not limited to, non-volatile media, and volatile media. Non-volatile media includes, for example, optical or magnetic disks, such as disk drive 1410. Volatile media includes dynamic memory, such as system memory 1406.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1420 (e.g., LAN, PTSN, or wireless network) may perform the sequence of instructions required to practice the invention in coordination with one another.

Computer system 1400 may transmit and receive messages, data, and instructions, including program, i.e., application code, through communication link 1420 and communication interface 1412. Received program code may be executed by processor 1404 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing model exchange in a system design, comprising:
   using a computing system that comprises at least one processor and is configured for performing:
   receiving, on a server, a first model exchange request from a first client, wherein
      the first model exchange request comprises a first synchronization record which comprises a delta of both a program aspect and a data aspect between a system design on the client and a system design on the server, and
      the delta of the program aspect comprises one or more differences between one or more programs used for collaborating on the system design on the client and one or more corresponding programs used for collaborating on the system design on the server;
   implementing the first model exchange request by processing the first model exchange;
   generating a second synchronization record in response to the first model exchange request;
   transmitting the second synchronization record to the first client by using a fusion technology; and
   displaying a result of implementing the first model exchange request on a display apparatus or storing the result in a tangible computer readable storage medium.

2. The computer implemented method of claim 1, further comprising:
   maintaining or identifying a first mapping between each of a plurality of local unique identifiers for the first client and a corresponding global unique identifier for the server, in which the each of a plurality of local unique identifiers and the corresponding global unique identifier identifies a component used in the system design.

3. The computer implemented method of claim 1, in which the action of receiving, on a server, a first model exchange request comprises:
   maintaining or identifying a global object table for a plurality of components in the system design on the server, in which the global object table comprises at least one entry for each of the plurality of components in the system design; and
   determining a new master system design based on the first synchronization record received.

4. The computer implemented method of claim 3, further comprising:
   describing each of the plurality of components by at least one of an anchor, an initial state of the each of the plurality of components, and a list of one or more changes to the each of the plurality of components; and
   maintaining or identifying a first mapping between the server and the first client for the plurality of components.

5. The computer implemented method of claim 3, in which the action of implementing the first model exchange request comprises:
   de-serializing the first synchronization record;
   allocating a global unique identifier for a new component created by the first client; and
   adding the new component in the system design to the global object table.

6. The computer implemented method of claim 5, further comprising:
   implementing a change made to an existing component in the system design by adding to or modifying the at least one entry in the global object table.

7. The computer implemented method of claim 6, in which the action of implementing a change made to an existing component is performed without detecting or reconciling a potential conflict for the existing component.

8. The computer implemented method of claim 2, in which the action of generating a second synchronization record comprises:
   identifying, in the second synchronization record, a first delta of a master representation on the server of a first component used in the system design on the first client;
   identifying a second delta of a second component which is not used in the system design on the client but is connected to the first client by one or more changes made to a persistent heap of the first client; and
   serializing the second synchronization record.

9. The computer implemented method of claim 8, further comprising:
   optimizing a change log; and
   converting the global unique identifiers of the first and the second component to corresponding local unique identifiers.

10. The computer implemented method of claim 1, further comprising:
    implementing access right management upon receiving the first model exchange request form the first client.

11. The computer implemented method of claim 10, further comprising:
    identifying a first information of the first client;
    determining an access right of the first client to the system design on the server based in part upon a first tier of the first client and the first model exchange request; and
    generating and transmitting the second synchronization record in response to the first model exchange request based at least in part on the access right of the first client.

12. The computer implemented method of claim 11, in which the action of determining an access right of the first client further comprises:
  partitioning the first model exchange request into at least one of a plurality of portions, wherein each of the plurality of portions corresponds to a respective tier which defines a respective level of access; and
  determining an access right of the first client to the at least one of a plurality of portions.

13. The computer implemented method of claim 11, further comprising:
  causing to remove a first model from the client based upon the access right determined.

14. The computer implemented method of claim 11, further comprising:
  modifying the access right of the first client based upon the access right determined.

15. The computer implemented method of claim 1, in which each of the server and the first client comprises a computing node, a programmable device, or a class, a task, a process, a job, an application, or a thread residing on the same computing node or programmable device.

16. The computer implemented method of claim 1, in which the delta comprises minimal difference in both the program aspect and the data aspect.

17. The computer implemented method of claim 1, in which the action of implementing the first model exchange request comprises:
  updating the system design on the server according to the first model exchange request received.

18. The computer implemented method of claim 1, further comprising:
  initiating a second model exchange request which comprises the second synchronization record; and
  transmitting the second model exchange request to a second client.

19. The computer implemented method of claim 1, in which the second synchronization record comprises a second delta made by a second client.

20. The computer implemented method of claim 1, in which the action of transmitting the second synchronization record to the first client comprises:
  identifying an internal common modeling framework which represents internally all external models in a common representation;
  importing the system model on the first client by processing the first model exchange request, wherein
    the system on the first client represents a part of the system design,
    the action of importing the system model on the first client further comprises preserving interpretation of the system model on the first client, and
    the computer implemented method requires no compliance on the first client on which the system model is constructed or updated; and
  determining a first internal common representation for the system model on the client within the internal common modeling framework.

21. The computer implemented method of claim 1, in which the second synchronization record comprises a second delta of both a program aspect and a data aspect between the system design on the first client and the system design on the server.

22. A computer implemented method for implementing model exchange in a system design, comprising:
  using a computing system that comprises at least one processor and is configured for performing:
    initiating, from a first client, a first model exchange request and transmitting the first model exchange request to a server, wherein
    the first model exchange request comprises a first synchronization record which comprises a delta of both a program aspect and a data aspect between a system design on the first client and a corresponding system design on the server, wherein
      the delta of the program aspect comprises one or more differences between one or more programs used for collaborating on the system design on the first client and one or more corresponding programs used for collaborating on the corresponding system design on the server;
    receiving a second synchronization record from the server, in which the second synchronization record comprises a second delta of both a program aspect and a data aspect between the system design on the first client and the corresponding system design on the server;
    processing the second synchronization record;
    completing the first model exchange request by applying a change log; and
    displaying a result of the first model exchange request on a display apparatus or storing the result in a tangible computer readable storage medium.

23. The computer implemented method of claim 22, further comprising:
  maintaining or identifying a first mapping between each of a plurality of local unique identifiers for the first client and a corresponding global unique identifier for the server, in which the each of a plurality of local unique identifiers and the corresponding global unique identifier identifies a component used in the system design.

24. The computer implemented method of claim 23, in which the action of receiving the second synchronization record from the server comprises:
  identifying, in the second synchronization record, a first delta of a master representation on the server of a first component used in the system design on the first client;
  identifying a second delta of a second component which is not used in the system design on the client but is connected to the first client by one or more changes made to a persistent heap of the first client; and
  serializing the second synchronization record.

25. A system for implementing model exchange in a system design, comprising:
  a computing system that comprises at least one processor and is configured for performing:
    receiving, on a server, a first model exchange request from a first client, wherein
      the first model exchange request comprises a first synchronization record which comprises a delta of both a program aspect and a data aspect between a system design on the client and a system design on the server, and
      the delta of the program aspect comprises one or more differences between one or more programs used for collaborating on the system design on the client and one or more corresponding programs used for collaborating on the system design on the server;
    implementing the first model exchange request by processing the first model exchange;
    generating a second synchronization record in response to the first model exchange;
    transmitting the second synchronization record to the first client by using a fusion technology; and displaying a result of implementing the first model exchange request or storing the result in a tangible computer readable medium.

26. The system of claim 25, wherein the computing system is further configured for performing:
maintaining or identifying a first mapping between each of a plurality of local unique identifiers for the first client and a corresponding global unique identifier for the server, in which the each of a plurality of local unique identifiers and the corresponding global unique identifier identifies a component used in the system design.

27. The system of claim 26, in which the computing system configured for performing the action of receiving the second synchronization record from the server is further configured for performing:
identifying, in the second synchronization record, a first delta of a master representation on the server of a first component used in the system design on the first client;
identifying a second delta of a second component which is not used in the system design on the client but is connected to the first client by one or more changes made to a persistent heap of the first client; and
serializing the second synchronization record.

28. A computer program product that includes a medium usable by a processor, the medium having stored thereon a sequence of instructions which, when executed by said processor, causes said processor to execute a process for implementing model exchange in a system design, the process comprising:
receiving, on a server, a first model exchange request from a first client, wherein
the first model exchange request comprises a first synchronization record which comprises a delta of both a program aspect and a data aspect between a system design on the client and a system design on the server, and
the delta of the program aspect comprises one or more differences between one or more programs used for collaborating on the system design on the client and one or more corresponding programs used for collaborating on the system design on the server;
implementing the first model exchange request by processing the first model exchange by using at least one processor;
generating a second synchronization record in response to the first model exchange;
transmitting the second synchronization record to the first client by using a fusion technology;
displaying a result of implementing the first model exchange request on a display apparatus or storing the result in a tangible computer readable storage medium.

29. The computer program product of claim 28, the process further comprising:
maintaining or identifying a first mapping between each of a plurality of local unique identifiers for the first client and a corresponding global unique identifier for the server, in which the each of a plurality of local unique identifiers and the corresponding global unique identifier identifies a component used in the system design.

30. The computer program product of claim 29, in which the process for receiving the second synchronization record from the server further comprises:
identifying, in the second synchronization record, a first delta of a master representation on the server of a first component used in the system design on the first client;
identifying a second delta of a second component which is not used in the system design on the client but is connected to the first client by one or more changes made to a persistent heap of the first client; and
serializing the second synchronization record.

31. A system for implementing model exchange in a system design, comprising:
a computing system that comprises at least one processor and is configured for performing:
initiating, from a first client, a first model exchange request and transmitting the first model exchange request to a server, wherein
the first model exchange request comprises a first synchronization record which comprises a delta of both a program aspect and a data aspect between a system design on the first client and a corresponding system design on the server, and
the delta of the program aspect comprises one or more differences between one or more programs used for collaborating on the system design on the client and one or more corresponding programs used for collaborating on the system design on the server;
receiving a second synchronization record from the server, in which the second synchronization record comprises a second delta of both a program aspect and a data aspect between the system design on the first client and the corresponding system design on the server;
processing the second synchronization record;
completing the first model exchange request by applying a change log; and
displaying a result of the first model exchange request or storing the result in a tangible computer readable storage medium.

32. The system of claim 31, wherein the computing system is further configured for performing:
maintaining or identifying a first mapping between each of a plurality of local unique identifiers for the first client and a corresponding global unique identifier for the server, in which the each of a plurality of local unique identifiers and the corresponding global unique identifier identifies a component used in the system design.

33. The system of claim 32, in which the computing system configured for performing the action of receiving the second synchronization record from the server is further configured for performing:
identifying, in the second synchronization record, a first delta of a master representation on the server of a first component used in the system design on the first client;
identifying a second delta of a second component which is not used in the system design on the client but is connected to the first client by one or more changes made to a persistent heap of the first client; and serializing the second synchronization record.

* * * * *